United States Patent [19]

de Castro Morshbacker et al.

[11] Patent Number: 4,849,190

[45] Date of Patent: Jul. 18, 1989

[54] PROCESS FOR THE PRODUCTION OF HYDRATED ALUMINA AND PROCESS FOR THE TREATMENT OF ACID WASTES

[75] Inventors: Antonio L. R. de Castro Morshbacker; Dante F. F. Filho; Joaquim M. F. Filho; Marcus C. da Fonseca; Ricardo T. de Mello, all of Rio de Janeiro, Brazil

[73] Assignee: Petroflex, Industria E Comercio S.A., Brazil

[21] Appl. No.: 45,555

[22] Filed: May 4, 1987

[30] Foreign Application Priority Data

May 5, 1986 [BR] Brazil ................................. 8602002
Aug. 7, 1986 [BR] Brazil ................................. 8603200

[51] Int. Cl.$^4$ ................................................ C01F 7/02
[52] U.S. Cl. ................................... 423/124; 423/127; 423/629; 423/DIG. 1; 210/724
[58] Field of Search ......... 423/124, 127, 629, DIG. 1; 210/724

[56] References Cited

U.S. PATENT DOCUMENTS

| 328,478 | 10/1885 | Freist | 423/127 |
|---|---|---|---|
| 1,732,772 | 10/1929 | Rinman | 423/127 |
| 1,951,443 | 3/1934 | Sanders | 423/127 |
| 2,659,660 | 11/1953 | Sablé | 423/123 |
| 2,988,520 | 6/1961 | Braithwaite | 502/263 |
| 3,864,461 | 2/1975 | Miller et al. | 423/628 |
| 4,019,978 | 4/1977 | Miller et al. | 208/213 |
| 4,154,812 | 5/1979 | Sanchez et al. | 423/626 |
| 4,584,108 | 4/1986 | Block | 423/629 |
| 4,666,614 | 5/1987 | Block | 423/629 |

FOREIGN PATENT DOCUMENTS

| 3243193 | 5/1984 | Fed. Rep. of Germany | 423/629 |
|---|---|---|---|
| 2380988 | 2/1978 | France | 423/629 |
| 138459 | 12/1971 | German Democratic Rep. | 423/629 |
| 2123804 | 2/1984 | United Kingdom | 423/629 |

OTHER PUBLICATIONS

Oxides and Hydroxides of Aluminum, Karl Wefers, Chanakya Misra, Alcoa Laboratories, 1987.

*Primary Examiner*—Robert L. Stoll
*Assistant Examiner*—Paige C. Harvey
*Attorney, Agent, or Firm*—Shlesinger & Myers

[57] ABSTRACT

Process for the production of hydrated aluminae through the precipitation of aluminum hydroxide in a reactor by the reaction of an aluminum compound soluble in a polar solvent with a precipitating agent, also solubilized in the polar solvent, in constant conditions of pH, temperature, concentration and agitation; concentration of the suspension of precipitated aluminum hydroxide; crystallization in an alkaline pH, essentially constant; separation of the crystallized aluminum hydroxide, for later washing and drying. The product obtained is homogeneous and with excellent characteristics for utilization in the manufacturing of catalysts and catalytic supports. The process can be applied, advantageously, in the treatment of the acid waste from processes which utilize Friedel-Crafts type reactions, obtaining, in addition to the hydrated alumina, a liquid effluent with low metal contents.

40 Claims, No Drawings

4,849,190

PROCESS FOR THE PRODUCTION OF HYDRATED ALUMINA AND PROCESS FOR THE TREATMENT OF ACID WASTES

The present invention refers to a process for the production of hydrated alumina in their various crystalline forms, such as: boehmite, pseudoboehmite, bayerite and gibbsite, pure or mixed among themselves or with amorphous gel; in addition a process is presented for the treatment of liquid acid waste from processes which apply Friedel-Crafts type reactions.

Hydrated alumina, or aluminum hydroxide, are substances widely applied in the modern industry. Among various utilizations, the most important are their use as precursors in the fabrication of catalysts for chemical and petrochemical processes. From hydrated alumina, after an adequate processing, a refractory, porous material is obtained, largely applied as a catalyst or as a support for the deposition of metals with catalytic activity.

The ultimate properties of the alumina catalyst or a support, such as activity, efficiency, stability and durability, are affected by the characteristics of the precursor hydrated alumina, reason why the presence of impurities must be avoided or minimized, whereas the stability and homogeneity of the hydrated alumina must be as high as possible. Minor variations in these characteristics may lead to substantial differences in the performance of a given catalyst. The properties of the precursor material which improve the catalytic activity are preferentially retained by the catalyst or support, which are the final products desired. In general, a good precursor material shall produce, after being processed, a catalyst or a support with good characteristics.

In this report references made both to hydrated alumina and to aluminum hydroxide refer to the same compound of formula (I) below:

$$Al_2O_3 \cdot nH_2O \qquad (I)$$

where n is between 1 and 10.

Countless processes for the production of hydrated alumina have been described to improve their properties as a precursor for an alumina catalyst or as a support. In general, the processes for the production of alumina include the following steps—precipitation of primary aluminum hydroxide during different periods, with the purpose of promoting the growth of alumina crystals in the crystalline phase which is desired. This step is achieved in an alkaline medium;

washing of crystallized hydrated alumina for the removal of ions which induce its catalytic property and mechanical existence;

drying of crystallyzed and washed hydrated alumina.

The precipitation reaction of aluminum hydroxide is frequently achieved through the combination of an acid aluminum compound, soluble in water, which may be $Al_2(SO_4)_3$, $Al(NO_3)_3$ or $AlCl_3$, with an aluminate of an alkaline metal, such as sodium or potassium aluminate.

Variants have been presented and these solutions are characterized to conduct a batch process, such as U.S. Pat. No. 4,019,978, which describes the precipitation of hydrated alumina through the reaction of aluminum sulfate in solution of concentration controlled between 2 and 5% in weight of $Al_2O_3$ with sodium aluminate in aqueous solution, obtaining the aluminum hydroxide in the form of a mud which has a concentration of 2 to 7% in weight, the solution of sodium aluminate is continuously added to the solution of aluminum sulfate during 30 minutes, and hydrated alumina precipitates under acid condition.

The composition of the mixture is controlled so as to interrupt the flow of aluminate as soon as the pH becomes basic, between 7.3 and 10.0.

U.S. Pat. No. 2,988,520 describes a process for the production of hydrated aluminae of high specific area and satisfactory density and resistance to friction, through the addition of aluminum sulfate to an alkaline aqueous solution of aluminate, the precipitation of aluminum hydroxide is achieved at a constant pH between 8.0 and 12.0 and the concentration of the reagents is controlled. The process of U.S. Pat. No. 3,864,461 produces alumina, particularly pseudoboehmite, controlling the temperature of reaction and the concentration of the reagents (aqueous solutions of sodium aluminate and aluminum sulfate). Aluminum hydroxide precipitates in an acid pH and later on crystallizes in an alkaline pH.

U.S. Pat. No. 4,154,812 presents improvement to the technique described above, although still conducting the process in a discontinuous way, introducing to the precipitation reactor the reagents in a simultaneous way, so as to maintain the reaction pH constant. The concentration of the reagents must be maintained within a narrow concentration range, the reactional medium being in constant agitation and previously heated. The addition of the reagents is conducted up to the end of the reation, when the flow of reagents is interrupted, thus characterizing the process as discontinuous, and the crystallization of precipitated primary aluminum hydroxide starts.

It may be observed in all of the processes herein described, as well as in the known processes in the present state of the art, the concentration of the reagents must be well determined and with little variation, the control of reaction pH is achieved in a difficult way and it is necessary to heat the reaction medium or the reagents or both.

A major inconvenience of the known processes in the present state of the art, in relation to the step of the precipitation reaction of the primary aluminum hydroxide, is the variation in the concentration of aluminum hydroxide, due to the reaction being conducted in batches, that is, the reagents are introduced into the reactor, a determined amount of aluminum is precipitated, the addition of reagents is interrupted ending a reaction cycle. As it is formed, aluminum hydroxide accumulates in the reactor and this variation in concentration leads to a product crystallinity heterogeneity, due to the precocious maturation of the hydroxide, making the reaction time become another highly critical variable of these processes.

The crystallization, or maturation, of the precipitated aluminum hydroxide is the next step, very important because it is in this step that the crystalline phase of the end product consolidates and here the characteristics of the precipitated aluminum hydroxide are of high relevancy. In the processes of the state of the art crystallization is achieved in the reactor itself after the end of the reaction and the pH adjustment for the adequate range.

In U.S. Pat. No. 4,019,978 the pH adjustment is achieved through the addition of sodium aluminate up to a pH between 7.3 and 10.0, and crystallization takes place after 3 hours. U.S. Pat. No. 4,154,812 crystallizes the aluminum hydroxide at a pH between 7.0 and 8.0, also with the addition of sodium aluminate; precipitation continues in this phase simultaneously to crystallization.

Conducting this crystallization operation with aluminum hydroxide prepared by these processes, it may be seen that a large amount of the alumina crystals formed start their maturation, or crystallization, before the fraction which precipitates at the end and in a pH inadequate to the crystalline structure intended; it may be observed that the end product appears highly heterogeneous in relation to crystallinity.

The step in which the crystallized aluminum hydroxide is washed is also a critical aspect strongly influenced by the characteristics of the primary aluminum hydroxide, since the content of ions of metals like sodium, potassium or others must be reduced in the end product and, as the product adsorbs the ion, this operation may become highly difficult or, else, require a large volume of water for each kilogram of product, which must be demineralized or deionized so as not to contaminate it. Various methods have been proposed, such as that which is described in patent FR No. 2,380,988, which uses water in an autoclave at 100°-125° C., in which the granules of alumina, or aluminum hydroxide, are placed in a basket and water drops are asperged onto the granules, from a condenser, or vaporized through aspersion nozzles until the impurities are eliminated. Patent DL 138,459 utilizes 100 liters of water per Kg of $Al_2O_3$ in the washing step.

U.S. Pat. No. 2,659,660 claims the obtention of alumina with low contents of sodium contaminants (nearly 20 ppm) based on the treatment of aluminum hydroxide during a period of 3 to 4 hours in a percolator at the temperature of 180°-220° C. under pressure, and U.S. Pat. No. 3,839,536 describes a process for the preparation of boehmite, alumina mono-hydrate, with residual sodium content lower than 60 ppm adding $CO_2$ to an aqueous solution of sodium aluminate for the production of an hydrated alumina which is washed and heated to 100°-300° C. under $CO_2$ pressure and finally the boehmite is separated.

It may be observed that, from the known processes, the steps subsequent to the precipitation and crystallization of aluminum hydroxide lead to an extremely high consumption of utilities, whether demineralized water whether electric power or else steam applying, as in the case of patents FR No. 2,380,988, U.S. Pat. Nos. 2,659,660 and 3,839,536, also high pressures for alumina washing, in addition to requiring, in the precipitation step, a rigid control of the concentration of the reagents.

Objects of the invention

Thus, one of the purposes of the present invention is to obtain, in a simple, repetitive way, a homogeneous aluminum hydroxide useful as a precursor for a catalyst or a catalytic support of high specific area and low content of contaminants, associated to a low consumption of utilities in the steps of filtration, washing and drying, without the utilization of expensive techniques and equipment or high pressures.

Another purpose of this invention is to obtain a homogeneous hydrated alumina, of controlled crystallinity, with a low content of contaminants, avoiding the inconveniences of the previous technique, so as to transmit to the catalyst or to the support, which later on shall be produced with the hydrated alumina of this invention, all of the properties inherent to the homogeneous product, that is, phase stability, mechanical and thermal strength and strong catalytic activity.

Still another purpose of the present invention is to obtain, by means of minor variations in the process conditions, hydrated alumina in their different crystalline phases, that is, boehmite, pseudoboehmite, bayerite and gibbsite, pure or in defined mixtures among themselves or with amorphous gel.

According to the present invention, a homogeneous hydrated alumina is prepared, with excellent characteristics for utilization in the manufacturing of catalysts and catalytic supports through the precipitation of aluminum hydroxide in a continuous reactor by means of the reaction of a water-soluble aluminum compound with a precipitating agent, also water-soluble, in conditions of constant pH, temperature, concentrations and agitation; concentration of the suspension of precipitated aluminum hydroxide; crystallization in alkaline, essentially constant pH; separation of crystallized aluminum hydroxide, for later washing and drying.

The process herein described and object of this invention presents innovating and surprising characteristics, such as not requiring a control of the concentrations of the reagents, which may be used in extremely diluted solutions up to the maximum concentration limited by the solubility product at the reactor temperature. Another surprising characteristic of the present invention is that the reagents do not have to be heated, although the process is extremely effective also when the reagents are previously heated, and that these do not have to be specific either for the process of the present invention; any combination of compounds which, in an aqueous medium, react among themselves producing aluminum hydroxide is applicable to the present invention.

The process of this invention presents other surprising, innovating characteristics, such as the maintenance of reaction pH control only by the ratio between the rates of the reagents, regardless of their concentrations; or, else, the concentration of aluminum hydroxide in the precipitation reactor being essentially constant, as well as the permanence of the aluminum hydroxide particles being constant and short, that is, the precipitated aluminum hydroxide remains for a short time in a pH unfavorable to crystallization, providing a primary aluminum hydroxide which is extremely homogeneous in its chemical and physical properties. Another discovery arising from the application of the present process is that the average permanence time of the aluminum hydroxide particles in the reactor, also referred to as residency time may be established in a wide range of values without the characteristics of the end product being altered.

Still another surprising result from the application of the process of this invention is that the primary aluminum hydroxide presents characteristics which grant it an excellent later processability in the steps of concentration, crystallization, separation, washing and drying. Due to the high homogeneity and narrow range of distribution of particles observed in the primary aluminum hydroxide, the various types of hydrated alumina can be produced as a pure phase or mixed among themselves, with various degrees of crystallization and crystal size, obtaining also considerable savings in the operations of concentration, separation, washing and drying which are conducted with a better performance.

An application for the present process is in the treatment of acid waste from processes which utilize reactions of Friedel-Crafts (F-C) type.

Since their discovery the reactions of Friedel-Crafts type have been widely utilized in the synthesis of various organic compounds, both in laboratory scale and in industrial plants. Although practically almost all classes of compounds may be prepared by Friedel-Crafts type reactions (F-C reactions) through direct application or variations of same, the main utilizations in industrial scale are related to the production of hydrocarbons and ketones. As an illustration, but not limited to this case, F-C reactions are utilized in the production of ethyl benzene, which is the raw material for styrene manufacturing; in the obtention of intermediate coloring products as benzoyl-benzoic acids; for the production of anthraquinone; alkylated benzene products for detergent manufacturing; production of phenylethanol, which is a raw material for perfumes; insecticides; polymers; cosmetics and pharmaceuticals.

Further information on reactions and catalysts of Friedel-Crafts type may be found in the specialized bibliography, such as, for instance, "Friedel-Crafts and Related Reactions", published by George A. Olah in 1963 by Interscience.

Among the catalysts for F-C reactions which are most utilized is aluminum chloride, which is utilized pure (produced "in situ" or not), in combination with metallic salts, complexed with alcohols, or alkyl halides, or alkyl nitrates, or sulfuric acid, or phosphoric acid, or sulfones, with or without solvents or co-catalysts.

In the processes which utilize aluminum chloride as a catalyst, the amount used varies according to the reaction to be conducted. In general, ratios of 0.1 to 7 mols of aluminum chloride to 1.0 mol of the product obtained are used.

After the F-C reaction it is necessary to remove fully or partially the catalyst from the reactional system and this is usually achieved washing the mixture which leaves the reactor (formed by residual reagents, products, by-products and the catalyst) with water to remove the whole aluminum chloride, which is soluble, separating it from the remaining organic phase (reagents, products and by-products of the F-C reaction).

After washing the mixture which leaves the Friedel-Crafts reactor and separating the organic phase from the aqueous phase, it may be verified that this acid water contains 0.2–3.0% in weight of aluminum (III) and 0.0–4.0% in weight of hydrochloric acid in solution and presents a pH between 0 and 3. This acid water must be adjusted to environmental regulations to be then discharged in natural watercourses.

The destination which is assigned to this solution of aluminum chloride, also referred to as acid water, is usually the plant for industrial waste treatment.

However, the requirements from environmental control bodies have become more and more strict, particularly in relation of the acidity of industrial waste and its content of metals and solids in suspension, forcing the industries to spend huge resources only to comply with environmental protection regulations.

The procedure for the treatment of this acid water varies with the availability of the industrial unit where the F-C reaction plant is installed; however, it is a usual practice to neutralize the pH of the acid water flow with soda and calcium hydroxide with the purpose of precipitating the aluminum hydroxide which is separated from the aqueous phase. This is discharged into natural watercourses and the aluminum hydroxide cake is discarded in several ways such as, for instance, in industrial earthfills, provided that is allowed by health and environmental authorities.

With the utilization of the method above described some inconveniences occur: not all of the aluminum precipitates (as aluminum hydroxide), that is, the aqueous phase resulting from the separation of the aluminum hydroxide cake still contains a rather high residual amount of aluminum III ions, and the aluminum cake obtained, depending on the laws in force, cannot be discarded indiscriminately, subjecting the company which produces said waste to the payment of fees for the disposal of the aluminum hydroxide cake in the sites allowed and even of heavy fines in case the aqueous phase disposed of does not meet the specification established by the local environmental authority.

It was discovered that, surprisingly, the process of the present invention solves advantageously the problems related to the treatment of waste from units which utilize aluminum chloride as a catalyst in F-C-reactions.

Thus, an aqueous waste is obtained within the most strict specifications of environmental control with low content of solids and neutral or almost neutral pH, and additionally hydrated aluminae are produced with raw material of low or even negative cost

DETAILED DESCRIPTION OF THE INVENTION

The process of the present invention is described in detail as follows:

(a) Continuous precipitation of primary hydrated alumina in constant conditions of pH, temperature, concentrations and agitation;

(b) Concentration and nucleation of the suspension of the primary hydrated alumina precipitated in step (a);

(c) Crystallization of the concentrated suspension of primary hydrated alumina;

(d) Separation and washing of the crystallized aluminum hydroxide; and (e) Drying the aluminum hydroxide crystallized and washed obtained in controlled temperature conditions.

According to the present invention any of the crystalline forms of the aluminum hydroxides may be obtained, both pure and mixed among themselves or with amorphous gel, only controlling the conditions of pH, temperature and residency time of steps (a), (b), (c), (d) and (e) of the process.

The step (a) of the present invention—precipitation of aluminum hydroxide—is initiated introducing the reacting solutions in a reactor vessel, continuously and simultaneously. The reagents may or may not be previously heated; preferably, for a better and most economical execution of the present invention, the reagents are simultaneously fed to the continuous reactor at room temperature. Not excluded in the process herein described is the possibility of feeding the reagents already pre-heated to the reactor at 15°–80° C., which could facilitate the precipitation of the hydrated alumina.

The precipitation reaction of the primary aluminum hydroxide is a reaction between an acid compound with a basic compound producing aluminum hydroxide, insoluble in water, and a salt, and may be represented by equation (I) below:

$$A(aq) + B(aq) \rightarrow Al(OH)_3 \cdot H_2O + C(aq) \qquad (I)$$

where A is an acid or basic aluminum compound in aqueous solution, B is a basic or acid precipitating compound in aqueous solution, the acid/basic character of coumpound B depending on the coumpound A utilized, and C is a compound co-produced in the reaction (I) which shall be separated in the subsequent steps.

Coumpound "A" may be acid or basic. The following compounds of acid character may be utilized as source of aluminum, "A", according to the present invention, although the process applies to any aluminum compound, acid and soluble in any polar solvent, $Al(NO_3)_3$, $AlF_3$, $AlCl_3$, $AlBr_3$, $AlI_3$, $Al(ClO)_3$, $Al(BrO_4)_3$, $Al(IO_2)_3$, $Al(IO_3)_3$, $Al(IO_4)_3$, $Al_2(SO_4)_3$, $Al(HSO_4)_3$, $Al(S_2O_7)_3$, $Al_2(S_2O_3)_3$, $Al(IO)_3$ or $AlPO_4$.

The basic compounds which may, according to the present invention, be sources of aluminum, substance "A" in reaction (I), are the aluminates of alkaline metals, $LiAlO_2$, $NaAlO_2$, $KAlO_2$, $RbAlO_2$, $CsAlO_2$, aluminates of alkaline-earth metals, such as: $CA(AlO_2)_2$ and $Mg(AlO_2)_2$ and other basic aluminum salts such as $Al(HCO_3)_3$, $Al_2(CO_3)_3$ among others.

Compound "B", a precipitating agent, must have an acid/basic character opposed to that of the aluminum compound, "A", that is, if "A" is acid, "B" must be basic and soluble in a polar solvent, including both strong Arrhenius bases, such as the hydroxides of alkaline metals NaOH, KOH and LiOH, hydroxides of alkaline-earth metals, such as $Ca(OH)_2$, $Mg(OH)_2$, or else a weak Arrhenius base such as $NH_4OH$ or else basic salts of alkaline or alkaline-earth metals, such as carbonates and bicarbonates of alkaline or alkaline-earth metals. Arrhenius base is defined as a compound which, in aqueous solution, causes an increase in hydroxyl ($OH^-$) concentration in the solution, according to reaction (II):

$$\text{Base } H_2O \rightarrow \text{Base}^+ + OH^- \qquad (II)$$

It is possible to utilize, as compound "B" in reaction (I), for the case in which compound "A" is acid, organic basic aminated compounds soluble in any polar solvent of formula as below

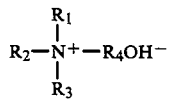

where $R_1$, $R_2$, $R_3$ and $R_4$ are organic, allylic, aromatic, cyclic radicals or hydrogen, equal or not among themselves, such as, but not limiting to, triethyl-methyl ammonium hydroxide, tetramethyl ammonium hydroxide, trimethyl-phenyl ammonium hydroxide, among others.

In case compound "A" is basic, "B" shall be acid, and it can be an acid aluminum compound such as, but not limited to those which are listed, since the process of the present invention is applicable to all acid aluminum compounds soluble in polar solvents, such as: $Al(NO_3)_3$, $AlF_3$, $AlCl_3$, $AlBr_3$, $AlI_3$, $Al(ClO)_3$, $Al(ClO_2)_3$, $Al(ClO_3)_3$, $Al(ClO_4)_3$, $Al(BrO)_3$, $Al(BrO_2)_3$, $Al(BrO_3)_3$, $Al(BrO_4)_3$, $Al(IO)_3$, $Al(IO_2)_3$, $Al(IO_3)_3$, $Al(IO_4)_3$, $A_2(SO_4)_3$, $Al(HSO_4)_3$, $Al(S_2O_7)_3$, $Al_2(S_2O_3)_2$ or $AlPO_4$.

Compound "B" may be also a strong inorganic acid such as $HCl$, $H_2SO_4$, $HNO_3$, $H_2S_2O_7$, $H_2S_2O_3$, $H_2PO_4$ or else strong organic acids such as fluoroacetic acid, difluoroacetic acid, trifluoroacetic acid, etc.

Are also applicable to the process of the present invention acid, organic or inorganic salts, such as ammonium chloride or ammonium trifluoroacetate, It must be understood that any compound which, reacting with compound "A", source of aluminum, produces aluminum hydroxide, is applicable to the process of the present invention, not being limited, obviously, to those previously mentioned.

Compound "C", co-produced in reaction (I), shall present a variable composition, depending upon the reagents which have been utilized, mentioning, for instance, "A" being aluminum sulfate and "B" being potassium hydroxide, compound "C" shall be potassium sulfate.

For a better execution of the present invention it is preferable to utilize as a source of aluminum, compound "A", aluminun nitrate, aluminum chloride or aluminum sulfate, or acid character, or sodium or potassium aluminate, of basic character.

The precipitating agents, compound "B", which best apply to the present invention are sodium hydroxide or potassium hydroxide or ammonium hydroxide, to react with an acid compound "A", or acid aluminum compounds such as $AlCl_3$, $Al(NO_3)_3$ or $Al_2(SO_4)_3$, to react with a basic compound "A".

The reagents are preferably utilized as aqueous solutions. When the compound cannot be obtained this way, the solution is prepared by means of solubilization of anhydrous or hydrated salt in water which may be deionized or process water with characteristics of determined minimum concentrations of impurities such as soluble salts of iron, sodium, potassium, calcium and others and soluble silica.

The concentration of the reagent in the aqueous solution utilized in the process of this invention encloses a rather wide concentration range, being able to work with highly diluted aqueous solutions, up to the maximum concentration limited by the solubility product of the reagent in the solvent, at the temperature of the solution.

The minimum concentration of aluminum salt in which this new process may be applied is extremely low, 0.2% in weight of aluminum, but may be as high as allowed. In case sodium or potassium aluminate is utilized as a source of aluminum, it is convenient to maintain in solution small amounts of free sodium hydroxide with the purpose of stabilizing the aqueous solution of aluminate.

The concentration of sodium and/or potassium aluminate in accordance with the process of this invention may be extremely low, in the range of 2–25% in equivalent weight of $Al_2O_3$, depending only on the stability of the aqueous solution. The excess of sodium hydroxide or potassium hydroxide, required to stabilize the aluminate solution, must be in accordance with the concentration of aluminate in solution. This excess of sodium hydroxide or potassium hydroxide must be only as required for the stabilization of the solution, as a way of reducing the consumption of hydroxide, in addition to reducing the amount of ions $Na^+$ or $K^+$ adsorbed in the primary aluminum hydroxide precipitated, which shall facilitate the elimination of same during the washing step, minimizing the volume of deionized water to be utilized in this step.

The addition of the reagents must be simultaneous and constant, so as to maintain the pH in the suspension of primary hydrated alumina precipiated in a constant value, previously determined depending on the crystalline form of hydrated alumina which one intends to prepare.

It is recommended that, prior to starting adding the reagents, the reactor be full of deionized water under agitation.

The pH of the precipitation reaction is adjusted and controlled by the present invention through the feeding flows ratio between the reagents, within a wide pH range between 3.0 and 10.0. One should preferably try to achieve the precipitation step in the acid pH range, between 4.0 and 7.5. The pH of the precipitation step of the present invention is one of the process variables allowing it to control the properties of the hydrated alumina which is to be produced; for instance, for the production of the hydrated alumina known as alumina α-monohydrate, or boehmite, the process of the present invention utilized the pH range between 4.0 and 6.0, not excluding the other ranges previously mentioned.

One of the relevant characteristics of the process of this invention is that the precipitation pH does not depend upon the concentrations of the reagents, but rather upon the ratio between the flow rates of the reagents fed to a continuous precipitation reactor.

This is one of the most important and relevant characteristics of the present invention—the reaction which produces the primary hydrated alumina being conducted in a continuous reactor—, so that as the reactor reaches a state of equilibrium, the concentration of the primary hydrated alumina in the reactor is practically constant. The precipitation of the primary hydrated alumina is achieved so that the concentration of that inside the reactor does not vary, or varies very little; as it is produced, the primary hydrated alumina is continuously removed from the reactor.

This is one of the aspects of the process of this invention which is unique among the processes for precipitation of hydrated alumina. In the processes described in the literature, such as, for instance, U.S. Pat. Nos. 2,988,520 or 4,154,812, the concentration of hydrated alumina in the precipitation step varies constantly during the addition of the reagents.

With this, as the precipitation occurs, the particles of aluminum hydroxide generated in the beginning of the reaction are not subject to precocius crystallization in relation to those which are precipitated at the end of the reaction, so that at the end of the precipitation, when the addition of the reagents is interrupted, the suspension contains particles of alumina which have not crystallized yet and particles of alumina which have already started the crystallization process.

Crystallization, or maturation, is achieved in a basic pH and consists of a change in the amorphous to crystalline phase of the alumina accompanied or not of an increase in the size of the crystal, and depends upon the time, temperature and pH, among other variables.

Thus, the homogeneity of the product becomes strongly affected, since the crystallization time is not uniform, nor is the pH in which the particles of alumina mature, which in the processes described in the state of the art starts acid, during the precipitation, and becomes basic. In the process of the present invention these inconveniences are overcome by the continuous removal of the primary alumina precipitated in the reactional medium for posterior crystallyzation. Thus, crystallization is homogeneous and well conducted.

In the process of the present invention, the residency time of the precipitate, hydrated alumina, in the reactor is also constant, which is another innovating, distinctive characteristic of the process of the present invention when compared with the existing processes. Residency time is understood as the ratio between the effective volume of the reactor, expressed, for instance, in liters, and the total flow rate of the reagents, expressed in units of volume per unit of time, for instance, liters/hour. The residency time, in the process of this invention, may be altered varying the feeding flow rate of the reagents and, in practice, the residency time may be within a wide range of values, without impairing the characteristics of the product, from 0.1 hour to 3.0 hours, depending only upon the production volume desired for a given reactor volume. Preferably, the residency time is higher than 0.5 and lower than 2.0 hours.

The precipitation temperature of the primary hydrated alumina, step (a) of the process of the present invention, must be maintained constant. In general, the present process applies to a wide range of temperatures, from 15° C. to 80° C., but the temperature range from 30° C. to 50° C. is preferable for the execution of the present invention.

It is known in the precipitation processes of hydrated aluminae by the reaction of an acid aqueous solution with a basic solution that the reaction is highly exothermic. The processes described in the literature do not take advantage of this heat of reaction, requiring almost always that the reactional medium be pre-heated, as in U.S. Pat. No. 4,154,812, which shall be later cooled back to room temperature to complement the reaction cycle conducted in batches (discontinuous); a waste of energy which can be obtained in the reaction itself occurs.

According to the process of the present invention, the heat of reaction is utilized to maintain the temperature of reaction. Depending upon the concentrations of the reagents and their flow rates, the heat of reaction required to reach the desired temperature may be insufficient, requiring an external source which may be electrical or steam or any other form of heating already dominated by the reactor construction technique. However, practice has shown that the need for external heating is not frequent for this invention, and, in case the precipitation temperatures of said hydrated alumina are within the range between 15° C. and 50° C., the reactor must be equipped with a cooling system, such as, for instance, cold-water circulation or another system of heat dissipation. Preferably, being more economical, the execution of the present invention should be conducted in the lower temperature range, up to 50° C. Whichever the temperature range to be utilized in step (a) of the present invention, the precipitation temperature of the primary hydrated alumina may be easily controlled to remain constant.

The speed of agitation, according to the present process, is maintained constant above 50 rpm.

The type of agitator to be utilized may be any one already known in the state of the art.

The primary aluminum hydroxide thus prepared presents very low crystallinity, being classified as amorphous or microcrystalline, presenting a mass drop of 10–35% when calcined. Other properties obtained are the high degree of nucleation, the homogeneity of the compound and the controlled size of the primary particles. These are unique characteristics of the process herein presented when compared with the other processes of alumina production in which the homogeneity of the aluminum hydroxide obtained is not achieved and the agglomerations degree is low. Similarly, up to the solution herein presented, a primary aluminum hydroxide associating low crystallinity to the homogeneity and controlled particle size could not be obtained.

The primary aluminum hydroxide prepared according to step (a) of the present invention, upon being led to sediment an adequate device, presented unique characteristics when compared to the aluminum hydroxides prepared by the precipitation processes of the state of the art, such as low sedimentation times associated to small volumes of the suspension concentrated.

Sedimentation is understood as the separation of solid particles dispersed in a solvent and forming a suspension under the action of gravity, with the formation of a nitid interface between a lower phase, composed primarily of most solid particles, and a new suspension well more concentrated that the initial one.

The characteristics of the solid particles present in the suspension are fundamental for the formation of the interface, determining the time required for obtaining a nitid separation between both phases and also the final volume of the lower phase, more concentrated.

The primary aluminum hydroxide precipitated according to the process of this invention characterizes by sedimenting rapidly. Between 0.5 and 10 hours a visible interface is formed, producing a concentrated phase of small volume; taking the ratio between the volume of the concentrated phase and the total volume of the initial suspension expressed in percent value, it may be concluded that the volume of the concentrated phase is in the range of 5 to 50% of the initial volume.

These properties of the primary aluminum hydroxide obtained by the present invention are of extreme importance for the subsequent steps of the process, since the granulometric characteristics of the material shall facilitate extremely the steps of concentration, separation and washing (steps b and d of the present process).

The obtention of the various crystalline forms of aluminum hydroxide, pure or mixed among themselves or with amorphous gel, is also facilitated by the homogeneity of the primary aluminum hydroxide obtained in this step (a).

The suspension of the primary aluminum hydroxide prepared in step (a) is continuously removed from the precipitation reactor and goes to step (b) where the concentration of the hydrated alumina is conducted in appropriate devices.

For the execution of the present invention, the concentration of the primary aluminum hydroxide may be achieved by various known techniques for the separation of solids from a suspension, such as, for instance, the utilization of devices for filtration, centrifugation or sedimentation.

The application, in step (b) of the present invention, of techniques such as batch or continuous centrifugation or, else, utilization of continuous filtration systems such as belt filters or other types such as circular, rotary filters or others, is facilitated with consequent reduction in filtration or centrifugation times, reduction in areas and/or volumes of equipment due to the control over the characteristics of the particles of primary aluminum hydroxide precipitated achieved in step (a) which leads to a rather narrow distribution of particle diameters. These techniques, however, which require expensive, power-consuming equipment, may be advantageously replaced by the utilization, in step (b), of sedimenters in view of the convenient speeds and low volumes of sedimentation achieved with the precipitate of primary hydrated alumina from step (a) of this process.

In case the concentration of the suspension of primary aluminum hydroxide is achieved by sedimentation, which is the best way for the execution of the present invention, extremely low volumes of concentrated suspensions of solids associated to optimum sedimentation times are achieved.

The volumes of suspension of solids obtained according to the present invention, utilizing the sedimentation technique for the separation of the solids, are approximately in the range of 5–50% of the initial volume of the suspension non-sedimented in sedimentation times varying from 0.5 to 10 hours.

During the concentration step the pH of the suspension is maintained constant and equal to the pH of the precipitation. If required, the pH of the suspension in concentration is corrected by the addition of an acid or base in accordance with the product which is to be obtained. For pH correction, inorganic or organic acids of low cost are utilized, such as hydrochloric, sulfuric or acetic acid, or others, according to the availability, or organic or inorganic bases of low cost, such as sodium or potassium hydroxide, sodium carbonate, ammonium hydroxide, or others, according to the availability.

The temperature of the concentration step is maintained constant. According to the present invention, the temperature in step (b) must be between 15° and 80° C.

Once the concentration of the hydrated alumina is completed, the phase is separated from the polar solvent, and the concentrated suspension of hydrated alumina is transferred to the crystallization equipment, or, in case step (b) is conducted in a sedimenting device, the sedimentation equipment itself may be used as a crystallizer for step (c) of the process of the present invention, which is the step referred to as crystallization. In case step (b) is conducted in filtration devices, the hydrated alumina cake formed shall be re-suspended in the polar solvent utilized, and then pass to step (c) of the present process. A volume of 0.1–20 liters of polar solvent per kilogram of cake obtained shall be utilized.

It has been verified that, surprisingly and unexpectedly, in step (b), the formation of the interface between the aqueous phase, the liquid which remains in the upper part of the sedimenting device, and the concentrated suspension of hydrated alumina which remains in the lower part of the sedimenting device, occurs in a nitid and well-defined way, making possible to accurately and easily separate both phases, by gravity or other simple means, such as pumping or siphoning. This well-defined separation of the aqueous phase from the concentrated suspension of hydrated alumina is important because it prevents losses of hydrated alumina which, otherwise, would remain suspended in the phase of the polar solvent which separates, favoring the reduction of production costs. The phase of the polar solvent which is separated characterizes by the low concentration of aluminum ions in solution which, according to the present invention, is below 500 ppm of aluminum ions in solution or suspension in the phase of the polar solvent which is separated, regardless of the device for the separation of solids from a suspension utilized in this step (b).

The suspension of hydrated alumina, separated from the phase of the polar solvent in step (b), passes to step (c), referred to as cystallization, or maturation step.

Crystallization consists of growth of hydrated alumina crystals under certain determined conditions of pH, temperature, agitation, time and pressure, depending on the type of hydrated alumina desired (boehmite, pseudoboehmite, bayerite or gibbsite), pure or mixed with other types or with amorphous gel. It is in this step that the characteristics of the end product are established and the homogeneity of crystallization conditions is most important to the quality of the product.

Crystallization is conducted under basic pH, between 7.5 and 12.5, and the adjustment of pH in the concentrated suspension of hydrated alumina which passes from step (b) to step (c) is achieved through the addition of an alkali until said range is reached.

Alkalis are chemicals which, in solution or in suspension in a polar medium, make the pH rise to values above 7 as, for instance, the hydroxides of alkaline metals—Na, K and Li, or those of alkaline-earth metals—Ca, Sr and Ba, or the salts of these metals or any compounds which, in a polar medium, make the pH rise to values above 7. In addition to the inorganic compounds mentioned may be utilized as well ammonium hydroxide, ammonia and organic compounds known as organic bases, compounds which contain one or more nitrogen atoms, also known as amines, or quaternary salts of organic bases. As an illustrative example of these organic compounds of industrial usage may be mentioned the methylamines, the ethylamines, the propylamines and others and their quaternary salts, such as tetramethylammonium hydroxide, tetrapropylammonium hydroxide and other quaternary hydroxides or their salts.

In the crystallization step of the present invention crystallization seeds of the phase intended may be added to induce the crystallization of the concentrated suspension of hydrated alumina in one of the types of alumina or mixtures of types of alumina which this process provides, that is: boehmite, pseudoboehmite, bayerite and gibbsite. It is also possible, according to the present process, to add substances known in the state of the art of preparing these crystalline phases of hydrated alumina capable of inhibiting a non-desired crystalline phase with the purpose of preparing the desired phase with higher concentration.

During the crystallization step of the process of the present invention the temperature is maintained constant between 15° and 80° C.

The crystallization time of the concentrated suspension of hydrated alumina is above 2.0 hours; said crystallization time is preferably above 3 hours and below 10.0 hours.

A major characteristic of the present invention is that one can control the average crystal size of the product intended, making it possible to prepare crystalline products of varying average size, from microcrystalline to macrocrystalline. Another important characteristic of this invention is that one can control the crystallinity degree of the product as well. Crystallinity degree is defined as the ratio between the amount of crystalline material and that of amorphous material in the product. In the process of the present invention it is possible to prepare products in the range from 70 to 100% crystallinity.

The average crystal size and the crystallinity degree of the products obtained through the present process may be determined by means of X-Ray analyses, which is a technique well established in the literature, being well known and documented the crystallographic characteristics of each phase (boehmite, pseudoboehmite, bayerite and gibbsite) and, thus, the type of product obtained can be determined, being present a phase pure or in mixture with others or in the presence of non-crystallized material.

The crystallization step of this process may be conducted with the concentrated suspension of hydrated alumina in rest, without agitation, or with slow agitation. Preferably, for best results, crystallization with slow agitation should be utilized, which makes it possible to obtain the homogeneous crystallization of the hydrated alumina in suspension. The present invention does not exclude the utilization of the crystallization techniques already known.

The pressure of the crystallization step may be atmospheric or above the atmospheric pressure.

The suspension of crystallized hydrated alumina of step (c) passes to step (d) of the process of the present invention, which consists of the separation of the crystallized hydrated alumina from the aqueous phase present, which may be achieved utilizing any known techniques of separation of solids from aqueous suspensions, such as continuous batch centrifugation, pressure filters, plate filters, belt filters or rotary filters at atmospheric pressure or vacuum. Preferably, filtering techniques which make it possible to wash the cake of crystallized material in one single operation should be utilized.

Due to the caracteristics of the process of the present invention, the operations of separation of solids in suspension are easily achieved, that is, large volumes of suspension with high rates of separation of solids may be processed; the solids prepared by the process of the present invention present optimum filtrability characteristics requiring small areas of filtering element for their separation. The hydrated aluminae, prepared with a high crystallinity degree, are not only separated rapidly and easily from the aqueous suspension, but are also easily washed for the elimination of impurities existing in the aqueous phase which may be absorbed in their surface. These impurities consist of cations of Na, K, Li, cations of metals resulting from alkalis of the aluminum salts utilized in steps (a) and (c), or anions, such as sulfates, nitrates, chlorides and others. The removal of said impurities may be achieved by means of the present invention, with small amounts of demineralized or deionized water. Ratios of 3 to 30 liters of demineralized water to 1 Kg of wet cake of crystallized hydrated alumina are typical of the process of the present invention. Preferably, the ratio of the volume of demineralized and deionized water expressed in liters to 1 Kg of wet cake of crystallized hydrated alumina must be between 10 and 25. Utilizing these ratios for washing it is possible to reduce the concentrations of ions to very low levels. The residual concentrations of ions in the dry cake of crystallized hydrated alumina, produced by the process of the present invention, are lower than 500 ppm; preferably these concentrations are lower than 200 ppm.

The utilization of small volumes of water for product washing is another relevant advantage of the present invention, making it possible to reduce the consumption of demineralized and/or deionized water, thus leading to major savings.

The cake of crystallized hydrated alumina presents, after being washed in step (d), an extremely low moisture content. With the process of this invention, the contents of solids in the cake of hydrated alumina crystallized and washed are between 5 and 50%; preferably, cakes with 1–35% of solids are obtained.

The step (e) of the present invention consists of the controlled drying of the washed cake of hydrated alumina of step (d). Cake drying must be conducted at low temperatures, with the purpose of preventing transformations in the crystalline nature of the hydrated alumina. Preferably, temperatures below 120° C. should be used. Cake drying may be achieved by various known methods, such as oven continuous furnaces, spray-drying rotatory kilns or other methods.

The hydrated alumina crystallized, washed and dried, after passing through all 5 steps of the process of this invention, presents a moisture content from 0 to 10%.

The present invention can, without any restriction, be used as a treatment of acid water, an effluent of processes which utilize Friedel-Crafts reactions.

The process for this raw material is described as follows:

Step (a) According to the present invention, the acid water is treated by the continuous precipitation of aluminum hydroxide, based on the reaction between the acid water, containing aluminum chloride, and an alkali in controlled conditions of temperature, pH, agitation and residency time.

The acid water may result from washing with water the products from a F-C reaction in which aluminum chloride was used as a catalyst in various forms, such as: pure, generated in the F-C reaction medium, as aluminum chloride "mud", complexed with alcohols, alkyl halides, alkyl nitrates, alkyl sulfates, sulfuric acid, sulfones, tertiary amines, among others.

The alkali applied to the present invention may be a hydroxide of alkaline metal, such as NaOH, LiOH or KOH, or else ammonium hydroxide or carbonates or bicarbonates of alkaline metals.

O pH of the precipitation reaction (step (a)) is maintained constant in the range from 3.0 to 10.0, preferably in the range from 4.0 to 7.5.

The temperature of step (a) is maintained constant in the range from 15° to 80° C. Temperature maintenance is achieved by means of cooling or heating, depending on the temperature in which the precipitation of aluminum hydroxide is conducted. Preferably, the range of temperatures is from 30° to 50° C. As the precipitation reaction of aluminum hydroxide is exothermic, in this preferential range of temperatures it is recommended to maintain the reactor cooled by means of an external jacket or other known way. The residency time is maintained constant in the range from 0.5 to 2.0 hours.

The reactional medium is maintained under constant agitation and the addition of the reagents and the removal of the products is continuously conducted.

Step (b) The effluent from the reactor is a suspension of particles of aluminum hydroxide which is then sent to a sedimenting device for the separation of the aluminum hydroxide precipitated from the treated acid water stream.

The characteristics of the process of the present invention are such as to allow a perfect separation in the sedimenting device of the aluminum hydroxide precipitated from the treated acid water. A separation of more than 99.99% of the aluminum hydroxide precipitated is achieved.

The content of solids in the treated acid water after the separation of aluminum hydroxide is always lower than 0.1% and the pH is always in the range between 5.5 and 7.5, specially between 6.0 and 7.3.

These characteristics are unique among the presently known processes; a clear treated acid water is obtained, with less than 0.01% of solids in suspension and with a pH already within the specification required, or very close to it, for discharge into natural watercourses. The corrections which may eventually become necessary are minor pH adjustments, utilizing often small amounts of commercial acids or bases, such as hydrochloric acid, acetic acid or sodium hydroxide, ammonium hydroxide or any other substance, acid or basic, easily available.

Another surprising characteristic of the present invention is the presence of less than 10 ppm of aluminum ions in the treated acid water. The process herein described applied to the treatment of acid water according to this invention presents an efficiency of almost 100% in the precipitation of aluminum hydroxide by the reaction of acid water with an alkali. Practically the whole aluminum III present in the acid water as aluminum chloride precipitates and, after the sedimentation, less than 10 ppm of aluminum III ions are found in the treated acid water.

Still another innovating characteristic of the present invention is that, applying the process herein described to the treatment of acid water, the mud of aluminum hydroxide obtained does not constitute a solid waste subject to disposal problems. The aluminum hydroxide sedimented and separated from the treated acid water is a very good raw material for producing precursor for catalysts or supports for impregnation or, else, for pharmaceutical and cosmetic industries.

The other steps follow: (c)—crystallization, (d)—filtration and washing and (e)—drying, conducted as already described, obtaining a hydrated alumina of high purity and quality.

It has been experimentally verified that the total content of cations and anions present in the washing waters of the alumina cake in step (d) is always lower than 150 ppm, making it possible to mix the washing waters of the alumina, utilized in this step of separation and washing, to the treated acid water and release them for disposal in natural watercourses without any inconveniences.

Once more the advantages of applying the process of the present invention to the treatment of waste from F-C reactions or acid water are verified.

The alumina, after drying, presents a moisture content between 0 and 10%.

As it can be seen, the problem of disposing of the acid water from processes which apply F-C reactions can be solved treating the acid water according to the process of the present invention.

The products manufactured with the process of the present invention are hydrated aluminae known as boehmite, pseudoboehmite, bayerite and gibbsite, pure or mixed between themselves or with amorphous gel as, for instance, boehmite plus pseudoboehmite or bayerite plus amorphous material.

Hydrated alumina are products of large industrial application. Without any character of exclusiveness, the products of the present invention can be utilized, performing better than the similar ones, as raw material for manufacturing catalysts and supports for catalyst production. For explanation purposes, it is possible to mention the catalysts for sulphur production by the Claus process, which may be manufactured from the products obtained with the present invention, and the catalysts for processes of ethanol dehydration for ethylene production, or else many other catalysts applicable to various petrochemical or petroleum refining processes.

The products obtained by the process of the present invention are also advantageously applicable as supports for deposition of other metallic compounds in the production of catalysts for HDS, for hydrotreatment of petroleum-derived compounds for processes of catalytic reforming of petroleum fractions.

As described, the wide industrial applications of the products obtained by the process of the present invention may be concluded.

The following examples illustrated, without limitation, the characteristics of the process of the present invention.

EXAMPLE 1

This example illustrates the preparation of one of the hydrated aluminae, boehmite, also known as aluminum monohydrate, by the process of the present invention.

Step (a): an aqueous solution of aluminum chloride with concentration equal to 5% in Al is added simultaneously with a solution of sodium hydroxide, at 15% in weight of NaOH, to a reactor provided with an external cooling/heating jacket, previously filled with demineralized water under agitation.

As the addition of the reagents is started the drainage valve of the reactor is opened for the removal of the reaction products. The flow rates of the reagents are adjusted so as to maintain the pH of the reactional medium between 5.8 and 6.5, measured by means of an electrode immersed in the reactor. Any pH variation are corrected varying the flow rate of one of the reagents.

As the precipitation reaction (I) of the primary aluminum hydroxide is highly exothermic, and the temperature must be controlled, water circulation at the reaction temperature (55° C.) is promoted. The reaction product is removed through the drainage valve of the reactor in a continuous way, being received in the vessel appropriate for its sedimentation.

Step (b): in the sedimenting device, the suspension of primary aluminum hydroxide is left in rest during a period of 3 hours at room temperature. At the end of this period, the upper aqueous phase is decanted. The concentrated suspension of solids (the lower phase) amounts to 35% of the volume of the original suspension.

Step (c): a solution of $NH_4OH$ at 28% is added to the concentrated suspension of solids while a slow agitation is maintained, until the pH of the suspension exceeds 8.0. Maintained said slow agitation, the suspension of hydrated alumina is left during a period of 3 hours at room temperature.

After this period the hydrated alumina crystallized with boehmite formation.

Step (d): the boehmite suspension is transferred to a filtration and washing system, separating the cake which, in the filter itself, is washed with 15 l of deionized water per Kg of filtrate cake.

Step (e): the cake, after being washed, is transferred to a drying system where, at a temperature of 120° C., a boehmite powder with 2% moisture is obtained. The boehmite prepared by means of this technique presents the following typical characteristics:

Chemical Composition

| | |
|---|---|
| $Al_2O_3$ | 77% |
| Loss by ignition | 23% |
| $SiO_2$ | absent |
| $Fe_2O_3$ | 20 ppm |
| $Na_2O$ | 100 ppm |
| S | absent |
| C | absent |

Physical Properties

| | |
|---|---|
| * Crystalline structure | Boehmite (α-monohydrate) |
| ** Specific area | 250 $m^2/g$ |
| * Average crystal size (reflection 020) | 50 Å |
| * Pore volume | 0.55 ml/g |
| Compact volume density | 0.70 g/ml |
| Granulometric analysis | passes #200 - 100% |
| Angle of rest | 40° |

Product Calcined at 500° C. - 1 h

| | |
|---|---|
| * Crystalline structure | α-alumina |
| ** Specific area | 220 $m^2/g$ |
| ** Pore volume | 0.50 ml/g |
| Compact volume density | 0.66 g/ml |

*As determined by X-Rays
**As determined by $N_2$ absorption

EXAMPLE 2

Utilizing the same procedure described in example 1, replacing the $NH_4OH$ solution by a NaOH solution for pH adjustment during the crystallization to a level above 8.5; the product obtained has the same characteristics of the product previously described, with a slight increase in $Na_2O$ concentration, which is 150 ppm. The utilization of other alkaline compounds for pH adjustment in the concentration step does not alter the relevant characteristics of the product prepared.

EXAMPLE 3

With the same procedure previously described in example 1, adjusting the rotation of the agitator to 1,000 rpm, a precipitate of hydrated alumina was obtained with primary particle size which, sedimented during 3 hours, provides a final volume of concentrated hydrated alumina corresponding to 20% of the initial volume. The characteristics of the end product are not altered.

EXAMPLES 4 and 5

With the same procedure previously described in detail in example 1, the crystallization time of step (c) is varied; the results obtained are presented in a summarized way on table 1; the products obtained are characterized

TABLE 1

| Examples | Crystallization Time | LI* (%) | Surface Area ($m^2/g$) | Average Crystal Size Å | d** (020) Å | Cristallinity (%) | Pore Volume (ml/g) |
|---|---|---|---|---|---|---|---|
| 4 | 3 | 26 | 260 | 27 | 6.71 | 67 | 0.27 |
| 5 | 7 | 22 | 340 | 41 | 6.32 | 74 | 0.41 |

*LI: Loss by ignition
**d: interplanar distance in plane 020 crystallographically by means of X-Rays as boehmite.

The figures presented on table 1 are not exclusive, being presented for the purpose of demonstrating the process of the present invention, which makes it possible to produce a large number of boehmites with a wide range of characteristical properties, which proves the flexibility of the process previously described.

EXAMPLES 6 THRU 8

With the same procedure previously described in example 2 various cakes are prepared with various thicknesses which have been washed with various amounts of deionized water, varying the ratio of liters of deionized water per Kg of cake; the values of residual Na in the dry product were determined by means of analysis by atomic absorption; the filtration experiments were conducted in a Büchner-type filtering system with filtering area of 200 cm$^2$, utilizing cloth of 10–15$\mu$ mesh as the filtering medium; in all of the experiments high filtration and washing rates were observed. The results are summarized on table 2.

TABLE 2

| Example | Cake weight (g) | Volume of deionized H$_2$O (l) | Na (ppm) |
| --- | --- | --- | --- |
| 6 | 500 | 5 | 50 |
| 7 | 500 | 10 | 35 |
| 8 | 500 | 15 | 15 |

EXAMPLE 9

300 liters/hour of a sample of acid water, the waste from a plant for the production of ethylbenzene (obtained by alkylation of benzene with ethylene by means of a F-C reaction catalyzed by aluminum chloride in a ratio of 6.5 Kg of catalyst per ton of ethylbenzene produced) were treated with 200 liters/hour of NaOH solution at 15% in weight in a reactor provided with agitation and external cooling jacket.

The sample of the water presented the following composition:

| | |
| --- | --- |
| Density | 1.100 g/l |
| pH | 0.3 |
| Aluminum (III) | 1.6% |
| Hydrochloric acid | 1.5% |
| Solids in suspension | free |
| Ethylbenzene + benzene | 1.0% |

The currents of acid water and NaOH were continuously added without interruption, maintaining the pH of the reactional medium between 5.5 and 6.5 and the temperature at 55° C. by means of cooling water circulation in the external jacket of the reactor.

The effluent from the reaction, a suspension of aluminum hydroxide, was continuously removed from the reactor and received in the sedimentation vessel, being left at rest during 3.0 hours for the separation of the aluminum hydroxide slurry from the treated acid water. It presented the following composition:

| | |
| --- | --- |
| pH | 6.5–7.0 |
| Aluminum (III) | 50–70 ppm |
| NaCl | 4.0% |

From these results it may be concluded that the precipitation of Al (III) from the acid water is practically quantitative together with the complete neutralization of the hydrochloric acid.

The aluminum hydroxide slurry, after being separated from the treated acid water was adjusted to a pH above 8 through the addition of an aqueous solution of ammonium hydroxide and crystallized by means of slow agitation at room temperature during 3.0 hours. The product obtained was filtered, washed and dryed at the maximum temperature of 120° C. and presented the following characteristics:

| Chemical Composition | |
| --- | --- |
| Alumina | 77.07% |
| Loss by ignition | 23.0% |
| Silicon oxide | absent |
| Iron oxide | 20 ppm |
| Sodium oxide | 100 ppm |
| Sulphur | absent |
| Carbon | absent |
| Physical Properties | |
| * Crystalline structure | Boehmite (-monohydrate |
| ** Specific area | 250 m$^2$/g |
| * Average crystal size (reflection 020) | 50 Å |
| *** Pore volume | 0.55 ml/g |
| Compact volume density | 0.70 g/ml |
| Granulometric analysis | passes #200 - 100% |
| Angle of rest | 40° |
| Product Calcined at 500° C. - 1 h | |
| * Crystalline structure | -alumina |
| ** Specific area | 220 m$^2$/g |
| *** Pore volume | 0.50 ml/g |
| Compact volume density | 0.66 g/ml |

*As determined by X-Rays
**As determined by BET
***As determined by nitrogen absorption The washing waters of the crystallized aluminium hydroxide are mixed with the treated acid water and released for disposal.

It may be verified thus that the treatment of the acid waste from F-C reactions utilizing the process herein described presents a high effectiveness degree, leaving in the treated acid water only traces of Al (III), the major contaminant of the acid water. The treated acid water, after being mixed with the washing waters of the crystallized hydrated alumina, is perfectly adequate to the environmental protection laws, and may be discharged into natural watercourses. The acidity, content of metals and solids in suspension in the treated acid water, applying the process of this invention, are within the specifications required by the environmental protection regulations.

EXAMPLE 10

Utilizing the same procedure described in the previous example, 450 liters/hour of acid water were treated with 140 liters/hour of NaOH solution at 30% in weight, obtaining the same results with only an increase in the content of sodium oxide present in the alumina. The quality of the treated acid water has not suffered any alteration, obtaining boehmite ($\alpha$-monohydrate).

We claim:

1. In a process for making aluminum hydroxide featuring the treatment of acid wastes by the neutralization of the acid liquid waste with an alkali, leading to the precipitation of aluminum hydroxide, including the steps of:
   (a) reacting the acid waste solution and an alkali selected from the group of alkaline metal hydroxide and ammonium hydroxide, in a continuous precipitation reactor maintaining constant pH, temperature, agitation and residence time, of between 0.5 and 2.0 hours, to produce an aluminum hydroxide suspension;
   (b) continuously feeding the aluminum hydroxide suspension to a sedimentor, (c) sedimentating the suspension of aluminum hydroxide in the sedimentor to separate at least 99.99% of the aluminum hydroxide produced in the precipitation reactor from neutralization of the acid wastes, the aluminum hydroxide having less than 10 ppm of aluminum III ions and a pH between 6.0 and 7.3;

(d) crystallizing the aluminum hydroxide under controlled, constant pH, maintained between 7.5 and 12.5, constant temperature, maintained between 15° and 80° C., and constant time, pressure and agitation to obtain homogenous aluminum hydroxide crystals of pure boehmite;

(e) separating, with a solid-liquid separator the crystallized aluminum hydroxide of substantially uniform crystal size and having pores of an average size of approximately 50 Å;

(f) washing the crystallized aluminum hydroxide where the washing waters have less than 150 ppm of total cation and anions;

(g) forming a cake of the washed crystallized aluminum hydroxide;

(h) drying the crystallized aluminum hydroxide cake at temperatures less than 120° C.

2. The process for making aluminum hydroxide according to claim 1 where the pH of the reaction step is maintained between 3.0 and 7.5.

3. The process for making aluminum hydroxide according to claim 1 where the temperature of the reaction step is maintained between 30° C. and 50° C.

4. The process for making aluminum hydroxide according to claim 1 where the aluminum in the reaction step is precipitated as aluminum hydroxide in the reactor.

5. The process for making aluminum hydroxide according to claim 1 where the pH during crystallization is corrected with the addition of a basic compound selected from the group consisting of alkaline metal hydroxides, alkaline-earth metal hydroxides, ammonium hydroxide, ammonia, organic bases, quaternary salts of organic bases, and hydroxides of organic bases.

6. The process for making aluminum hydroxide according to claim 1 where the crystallization time is between 2.0 and 20.0 hours.

7. The process for making aluminum hydroxide according to claim 1 including the step of adding crystallization seeds and crystallization inhibitors during the crystallization step.

8. The process for making aluminum hydroxide according to claim 1 where the crystallized aluminum hydroxide is washed with 1.0 to 25.0 liters of deionized water per kilogram.

9. The process for making aluminum hydroxide according to claim 1 where the acid liquid waste contains waste products from Friedel-Crafts type reactions resulting from washing the products from the Friedel-Crafts type reaction with water to remove the catalyst of the Friedel-Crafts type reaction.

10. The process for making aluminum hydroxide according to claim 9 where the reaction is a Friedels-Crafts type and the catalyst is aluminum chloride in a complex with a compound selected from the group consisting of alcohols, alkyl nitrates, alkyl halides, alkyl sulfates, sulfuric acid, phosphoric acid, sulfones and tertiary animes.

11. The process for making aluminum hydroxide according to claim 1 where the aluminum hydroxide produced possesses crystalline phases selected from the group of boehmite, pseudoboehmite, bayerite or gibbsite.

12. A process for production of hydrated alumina with a content of residual ions of less than 350 ppm, comprising the steps of:

(a) providing a volume of a polar solvent in a continuous precipitation reactor which maintains constant agitation, pH, concentration of product suspension, temperature and residency time, (b) to the precipitation reactor at a temperature between 50° and 80° C. continuously feeding an aluminum source compound and a precipitating-agent compound which have acid/base characteristics opposed to each other, each in a concentration of at least 0.2% weight and having limiting reagent solubility in the solvent at the reaction temperature, (c) obtaining suspended hydrated alumina precipitate, (d) concentrating the obtained suspended hydrated alumina precipitate in a liquid-solid separator at constant pH and constant temperature by removing the polar solvent to obtain a concentrated precipitate having less than 500 ppm of aluminum ions, (e) crystallizing the concentrated alumina precipitate in an alkaline solution having a constant pH between 7.5 and 12.5, a temperature between $15°-\lambda°$ C. and at least one atmosphere of pressure, thereby obtaining substantially uniform-sized homogeneous hydrated alumina of pure boehmite crystals having a pore volume of at least 0.41 ml /gram, (f) separating and washing the alumina crystals to obtain hydrated alumina cake having a 5% to 50% alumina crystal content, and (g) drying the alumina cake at temperatures below 120° C. to obtain a cake with a moisture content under 10% weight and residual anion and cation concentration of less than 300 ppm.

13. The process for the production of hydrated alumina according to claim 12, where the aluminum-source compound is a water soluble acid aluminum compound selected from the group consisting of aluminum sulfate, aluminum nitrate and aluminum chloride.

14. The process for the production of hydrated alumina according to claim 13 where the precipitating agent is a water soluble, basic compound.

15. The process for the production of hydrated alumina according to claim 14 where the precipitating agent is a strong inorganic base.

16. The process for the production of hydrated alumina according to claim 12, where the aluminum-source compound is basic, soluble in water and an alkaline metal aluminate.

17. The process for the production of hydrated alumina according to claim 16, where the precipitating agent is a water soluble acid aluminum compound selected from the group consisting of aluminum sulfate, aluminum nitrate and aluminum chloride.

18. The process for the production of hydrated alumina according to claim 16 where the precipitating agent is a water soluble compound acid selected from the group consisting of strong organic acids, strong inorganic acids and their salts.

19. The process for the production of hydrated alumina according to claim 12, further comprising the step of controlling the flow rates of the alumina source compound and precipitating agent to achieve a pH between 3.0 and 10.0.

20. The process for the production of hydrated alumina according to claim 12, where the residency time of the compounds in the precipitation reactor is stabilized between 0.1 and 3.0 hours.

21. The process for the production of hydrated alumina according to claim 12, where the reaction temperature is maintained constant between 15° and 80° C.

22. The process or the production of hydrated alumina according to claim 21, where the precipitation reaction temperature is maintained with the utilization of the heat from the precipitation reaction.

23. The process for the production of hydrated alumina according to claim 12 further including the step of maintaining the agitation of the precipitation reactor constant and above 50 rpm.

24. The process for the production of hydrated alumina according to claim 12 where the suspended hydrated alumina obtained in the precipitation reactor is of constant composition and homogeneous crystallinity.

25. The process for the production of hydrated alumina according to claim 24 where the suspended hydrated alumina has a narrow range of granulometric distribution and is sedimented in a period of time between 0.5 and 10 hours.

26. The process for the production of hydrated alumina according to claim 24 where the suspension of hydrated alumina has a sedimented volume of 5–50% of the original volumes of the aluminum source compound and the precipitating agent compound.

27. The process for the production of hydrated alumina according to claim 12 where the pH during the concentrating step is corrected with a acid or base and maintained constant between 3.0 and 10.0.

28. The process for the production of hydrated alumina according to claim 12 where the concentrating step is conducted at a constant temperature between 15 and 80° C.

29. The process for the production of hydrated alumina according to claim 12 where the concentrating step is conducted inside a sedimentation device.

30. The process for the production of hydrated alumina according to claim 29 where the volume of sedimented hydrated alumina is 5–55% of the initial volume of the suspension of hydrated alumina, in sedimentation times varying from 0.5 to 10 hours.

31. The process for the production of hydrated alumina according to claim 12 where concentration of the suspended hydrated alumina is conducted by a filtration device.

32. The process for the production of hydrated alumina according to claim 31 where the hydrated alumina obtained in the concentrating step is resuspended with 0.1 to 20 liters of a polar solvent per Kg of hydrated alumina.

33. The process for the production of hydrated alumina according to claim 12 further including the step of adding crystallization seeds to the hydrated alumina to induce crystallization.

34. The process for the production of hydrated alumina according to claim 33 further including the step of adding crystallization inhibitors to the hydrated alumina to obtain a higher concentration of crystallized precipitate.

35. The process for the production of hydrated alumina according to claim 12, where the time for crystallizing the alumina precipitate exceeds 2 hours.

36. The process for the production of hydrated alumina according to claim 12 where the crystallized hydrated alumina has a crystallinity degree from 70 to 100%.

37. The process for the production of hydrated alumina according to claim 12, further including the step of slowly agitating the hydrated alumina during the crystalization step.

38. The process for the production of hydrated alumina according to claim 12, where the separation step is conducted inside a continuous filtration device.

39. The process for the production of hydrated alumina according to claim 12 where the crystalized hydrated alumina is washed with 5–30 liters of deionized water per kilogram of hydrated alumina.

40. The process for the production of hydrated alumina according to claim 12, where the content of solids in the crystallized hydrated alumina cake from the separation step is between 10 and 35%.

* * * * *